US008879279B2

(12) United States Patent
Luo et al.

(10) Patent No.: US 8,879,279 B2
(45) Date of Patent: Nov. 4, 2014

(54) SYSTEMS AND METHODS FOR CONSTANT CURRENT CONTROL IN AN LLC RESONANT POWER REGULATOR

(75) Inventors: Yuwei Luo, Naperville, IL (US); Bosheng Sun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 728 days.

(21) Appl. No.: 13/107,423

(22) Filed: May 13, 2011

(65) Prior Publication Data
US 2012/0287680 A1    Nov. 15, 2012

(51) Int. Cl.
*H02M 3/335*    (2006.01)
*H02M 1/00*    (2006.01)

(52) U.S. Cl.
CPC ...... *H02M 3/33507* (2013.01); *H02M 3/33592* (2013.01); *H02M 2001/0019* (2013.01); *Y02B 70/1433* (2013.01); *H02M 2001/0058* (2013.01)
USPC .......... 363/21.02; 363/21.06; 363/97

(58) Field of Classification Search
USPC ............ 363/21.02, 21.03, 21.04, 21.11, 97, 363/131, 21.14, 21.06, 127
See application file for complete search history.

(56) References Cited

U.S. PATENT DOCUMENTS

| | | | | |
|---|---|---|---|---|
| 6,101,108 A | * | 8/2000 | Wittenbreder, Jr. | 363/65 |
| 7,911,810 B2 | * | 3/2011 | Shimada et al. | 363/17 |
| 2009/0097280 A1 | * | 4/2009 | Wu et al. | 363/17 |
| 2011/0299301 A1 | * | 12/2011 | Huang | 363/17 |
| 2011/0305044 A1 | * | 12/2011 | Huang | 363/21.02 |

* cited by examiner

*Primary Examiner* — Gary L Laxton
*Assistant Examiner* — Afework Demisse
(74) *Attorney, Agent, or Firm* — William B. Kempler; Frederick J. Telecky, Jr.

(57) ABSTRACT

One embodiment relates to an LLC resonant power converter system. The system includes a transformer comprising a primary inductor and a secondary inductor and a switch control stage configured to generate a plurality of switching signals having a duty-cycle. The system also includes an input stage comprising the primary inductor and a plurality of switches that are controlled in response to the respective plurality of switching signals to generate a primary resonant current and an output stage comprising the secondary inductor and being configured to conduct an output current through a load based on a secondary resonant current to generate an output voltage. The system further includes a controller configured to limit a magnitude of the output current to a predetermined magnitude in response to variations of the load.

19 Claims, 5 Drawing Sheets

SYSTEMS AND METHODS FOR CONSTANT CURRENT CONTROL IN AN LLC RESONANT POWER REGULATOR

TECHNICAL FIELD

The present invention relates generally to electronic circuits, and specifically to systems and method for constant current control in an LLC resonant power regulator.

BACKGROUND

There is an increasing demand for power regulation circuitry to operate with increased efficiency and reduced power dissipation to accommodate the continuous reduction in size of electronic devices. Switching regulators have been implemented as an efficient mechanism for providing a regulated output in power supplies. The switching regulator (also known as a switching power supply) can control the flow of power to a load by controlling the on and off duty-cycle of one or more switches coupled to the load. Many different classes of switching regulators exist today.

As a further example, a resonant power regulator can be configured with a resonant tank that conducts an oscillating resonant current based on a power storage interaction between a capacitor and an inductor, such as in a primary inductor of a transformer. The oscillating resonant current can be generated based on the operation of the switches, and can thus induce a current in a secondary inductor of the transformer. Therefore, an output voltage can be generated based on the output current. Resonant power regulators can be implemented to achieve very low switching loss, and can thus be operated at substantially high switching frequencies.

SUMMARY

One embodiment of the present invention includes an LLC resonant power converter system. The system includes a transformer comprising a primary inductor and a secondary inductor and a switch control stage configured to generate a plurality of switching signals having a duty-cycle. The system also includes an input stage comprising the primary inductor and a plurality of switches that are controlled in response to the respective plurality of switching signals to generate a primary resonant current and an output stage comprising the secondary inductor and being configured to conduct an output current through a load based on a secondary resonant current to generate an output voltage. The system further includes a controller configured to substantially limit a magnitude of the output current to a predetermined magnitude in response to variations of the load.

Another embodiment of the present invention includes a method for maintaining a substantially constant output current in an LLC resonant power regulator. The method includes generating switching signals having a duty-cycle and controlling a plurality of switches via the duty-cycle to generate a primary resonant current through a primary inductor of a transformer. The method also includes measuring a magnitude of an output current generated based on the primary resonant current via a secondary inductor of the transformer and operating the LLC resonant power regulator in a normal resonance operating mode in response to a magnitude of the output current being less than a predetermined reference current. The method further includes operating the LLC resonant power regulator in a constant-current operating mode in response to the magnitude of the output current being at least approximately equal to the predetermined reference current to maintain the magnitude of the output current approximately equal to the predetermined reference current.

Another embodiment of the present invention includes an LLC resonant power converter system. The system includes a transformer comprising a primary inductor and a secondary inductor and a switch control stage configured to generate a first plurality of switching signals and a second set of switching signals. The system also includes an input stage comprising the primary inductor, an inductance circuit, and a first plurality of switches that are controlled in response to the respective first plurality of switching signals to generate a primary resonant current. The system also includes an output stage comprising the secondary inductor and a second plurality of switches that are controlled in response to the respective second plurality of switching signals to conduct an output current through a load based on the primary resonant current to generate an output voltage. The system further includes a controller configured to control the inductance circuit to limit a magnitude of the output current to a predetermined magnitude in response to variations of the load.

Yet another embodiment of the present invention includes an LLC resonant power converter system. The system includes a transformer comprising a primary inductor and a secondary inductor and a switch control stage configured to generate a first plurality of switching signals and a second set of switching signals in response to at least one pulse-width modulation (PWM) signal. The system also includes an input stage comprising the primary inductor and a first plurality of switches that are controlled in response to the respective first plurality of switching signals to generate a primary resonant current. The system also includes an output stage comprising the secondary inductor and a second plurality of switches that are controlled in response to the respective second plurality of switching signals to conduct an output current through a load based on a secondary resonant current to generate an output voltage. The system further includes a controller configured to set the at least one PWM signal to control the second plurality of switches via the second plurality of switching signals in a normal resonance operating mode to regulate the output voltage and to set the at least one PWM signal to control the second plurality of switches via the second plurality of switching signals in a constant-current operating mode to substantially limit a magnitude of the output current approximately equal to a predetermined current magnitude.

DETAILED DESCRIPTION

This disclosure relates generally to electronic circuits, and specifically to systems and method for constant current control in an LLC resonant power regulator. The LLC resonant power regulator system can include a transformer having a primary inductor and a secondary inductor. An input circuit includes the primary inductor and can act as an input resonant tank. Therefore, a primary resonant current is generated in the input circuit, which thus induces an output current in the secondary inductor in an output circuit. The output current can thus flow through a load to generate an output voltage. The output voltage can be monitored by the system to set a duty-cycle of a set of switches in at least the input circuit to regulate the output voltage. As an example, the switches can be configured as a half-bridge arrangement of transistors (e.g., metal-oxide semiconductor field effect transistors (MOSFETs)).

In addition to monitoring the output voltage, the system can also monitor the output current. A controller can switch the LLC resonant power regulator system between a normal resonance operating mode and a constant-current operating mode based on the magnitude of the output current such as corresponding to variations of the load. As described herein, the constant-current operating mode can be an operating mode at which the output current is equal to a predetermined reference current, such that the LLC resonant power regulator is configured to maintain the output current approximately equal to the predetermined reference current in the constant-current operating mode. As an example, the controller can limit the duty-cycle of the switches in the input circuit to limit the magnitude of the output current to the predetermined reference current. As another example, the controller can transform the LLC resonant converter into an asymmetrical half-bridge converter by activating an inductive circuit in the input circuit to inject magnetizing inductance into the input circuit, thus transforming the input circuit into an asymmetrical half-bridge to limit the output current. As yet another example, the controller can change the manner of switching of a set of switches in the output circuit to rectify the output current, thus limiting the output current.

Figure 1:
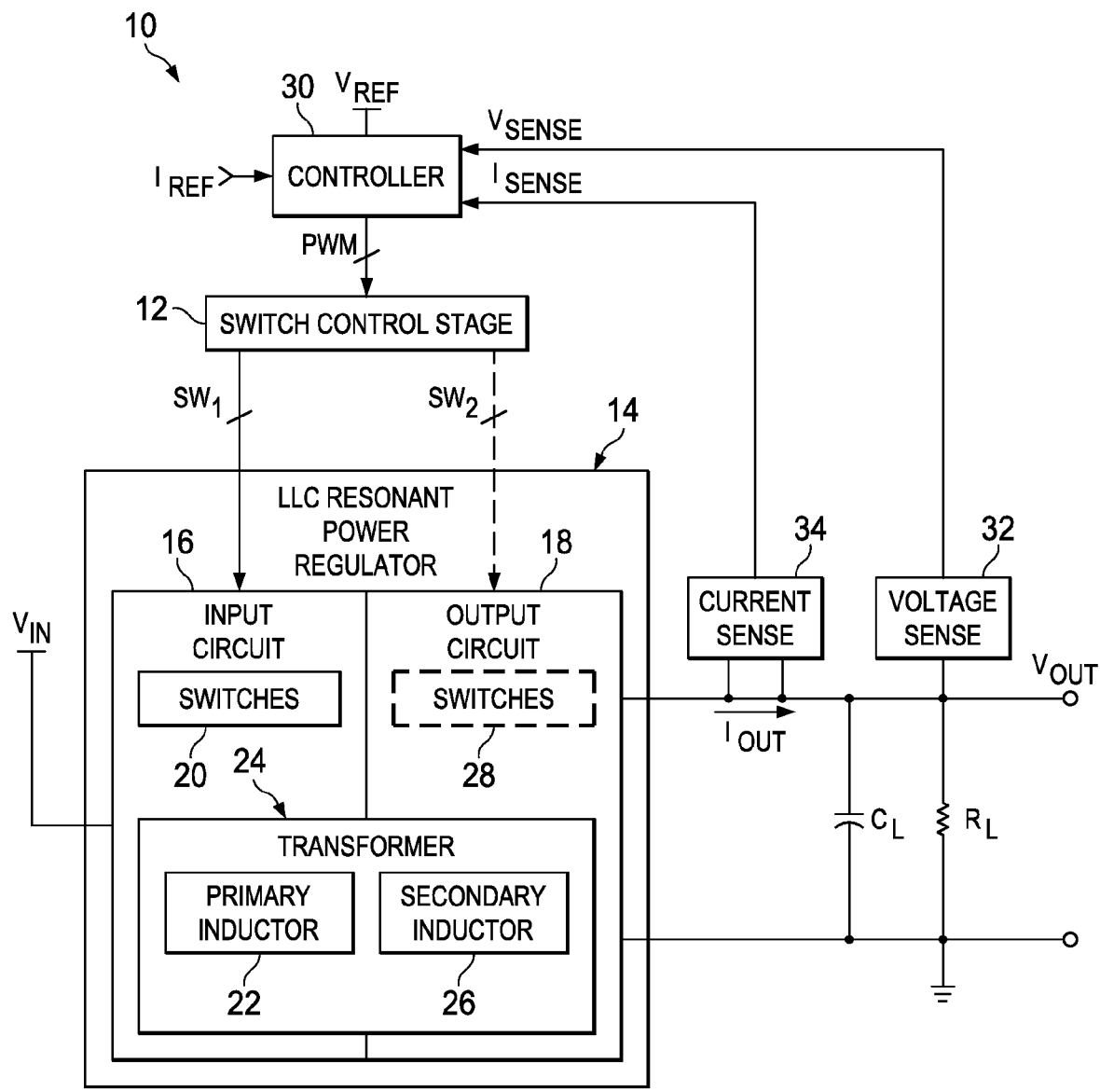
FIG. 1 illustrates an example of an LLC resonant power regulator system in accordance with an aspect of the invention.

FIG. 1 illustrates an example of an LLC resonant power regulator system 10. The LLC resonant power regulator system 10 is configured to generate an output current $I_{OUT}$ that flows through a load, demonstrated as $R_L$, in parallel with a load capacitor $C_L$ based on an input voltage $V_{IN}$. While the load is demonstrated as an RC load, it will be understood that the load may also include other types of impedance depending on application requirements for the system. The LLC resonant power regulator system 10 can be implemented in a variety of applications, such as in any of a variety of portable electronic devices.

The LLC resonant power regulator system 10 includes a switch control stage 12 configured to generate a plurality of switching signals. In the example of FIG. 1, the switching signals are demonstrated as sets of switching signals $SW_1$ and $SW_2$. As an example, the switch control stage 12 can include logic and/or drivers to generate the switching signals $SW_1$ and $SW_2$ based on a pulse-width modulation (PWM) signal, demonstrated in the example of FIG. 1 as a signal PWM. The LLC resonant power regulator system 10 also includes an LLC resonant power regulator 14 that includes an input stage 16 and an output stage 18. The input stage 16 is interconnected between a high voltage rail, demonstrated as the input voltage $V_{IN}$, and a low voltage rail, demonstrated as ground. The input stage 16 includes a plurality of switches 20 that are controlled by the switching signals $SW_1$. As an example, the switches 20 can be configured in a half-bridge arrangement coupled between voltage rails. For instance, the switches 20 can include a pair of switches interconnected between the rails by a control node. The control node can be an output node of the input stage 16 that generates a primary resonant current according to activation and deactivation of the switches 20.

In the example of FIG. 1, the input stage 16 includes a primary inductor 22 of a transformer 24, such that the primary resonant current can flow through the primary inductor 22 of the transformer 24 as well as, for example, a leakage inductor. The LLC resonant power regulator system 10 also includes an output stage 18. In the example of FIG. 1, the output stage 18 can include a secondary inductor 26 of the transformer 24. In response to the flow of the primary resonant current through the primary inductor 22 of the transformer 24, the secondary inductor 26 of the transformer 24 generates an output current $I_{OUT}$ (e.g., based on a magnetic flux through the core of the transformer 24). The output stage 18 is configured to conduct the output current $I_{OUT}$ in response to the primary resonant current, such that the output current $I_{OUT}$ can flow through the secondary inductor 26 of the transformer 24 as well as, for example, a leakage inductor that can be coupled to the load $R_L$. In the example of FIG. 1, the output stage 18 can also include a set of switches 28 that are controlled by the switching signals $SW_2$ to rectify the output current $I_{OUT}$. Accordingly, the output current $I_{OUT}$ flowing through the load $R_L$ generates an output voltage $V_{OUT}$ across the load $R_L$.

The LLC resonant power regulator system 10 further includes a controller 30, a voltage sense device 32 configured to monitor a magnitude of the output voltage $V_{OUT}$ and a current sense device 34 configured to monitor a magnitude of the output current $I_{OUT}$. For instance, the voltage sense device 32 can be configured as a voltage-divider that provides a sense voltage $V_{SENSE}$ to the controller 30 in a feedback manner, with the sense voltage $V_{SENSE}$ having a magnitude that is proportional to the output voltage $V_{OUT}$. As another example, the current sense device 34 can be implemented as a sense resistor or other current sensing device (e.g., Hall-effect sensor) that provides a sense current $I_{SENSE}$ to the controller 30 in a feedback manner, with the sense current $I_{SENSE}$ being proportional to the magnitude of the output current $I_{OUT}$. For example, the sense current $I_{SENSE}$ could be a voltage signal having a magnitude that is indicative of the magnitude of the output current $I_{OUT}$.

The controller 30 can be configured to compare the sense voltage $V_{SENSE}$ with a predetermined reference voltage $V_{REF}$ to generate the signal PWM. As an example, the signal PWM can include one signal, or can include a plurality of signals. The signal PWM is demonstrated in the example of FIG. 1 as being provided to the switch control stage 12, such that the switch control stage 12 can generate the switching signals $SW_1$ and/or $SW_2$ based on the signal PWM. Therefore, the controller 30 can regulate the output voltage $V_{OUT}$ in a normal resonance operating mode of the LLC resonant power regulator system 10 to substantially maintain the output voltage $V_{OUT}$ at a predetermined magnitude.

In addition, the controller 30 can be configured to compare the sense current $I_{SENSE}$ with a predetermined reference current $I_{REF}$. The controller 30 can thus operate the LLC resonant power regulator system 10 in a normal resonance operating mode or in a constant-current operating mode based on the magnitude of the output current $I_{OUT}$. This dual mode of operation can be achieved by having two control loops that operate concurrently and cooperate to achieve the different operating modes according to operating parameters of the system 10. For example, the controller 30 can be configured, in the constant-current mode, to substantially limit the magnitude of the output current $I_{OUT}$ to a predetermined magnitude (e.g., the predetermined reference current $I_{REF}$) in response to detecting variations of the load. For example, the controller 30 can operate the LLC resonant power regulator system 10 in the normal resonance operating mode based on the magnitude of the output current $I_{OUT}$ being less than the predetermined reference current $I_{REF}$. However, in response the output current $I_{OUT}$ increasing in magnitude, such as in response to a short-circuit condition or overload condition, the controller 30 can switch to the constant-current operating mode to substantially maintain the magnitude of the output current $I_{OUT}$ approximately equal to the predetermined reference current $I_{REF}$.

As described herein, the controller 30 is configured to substantially limit the magnitude of the output current in the constant-current mode in a variety of ways. As an example, the controller 30 can be configured to modify the signal PWM to substantially reduce the duty-cycle of the switching signals $SW_1$, thus reducing the on-time of the switches 20 in the input stage 16. As another example, the controller 30 can be configured to activate an inductance circuit in the input stage 16 to inject a magnetizing inductance into the input stage to limit the resonance of the primary resonant current, thus limiting the output current. As yet another example, the controller 30 can change a manner in which the switching signals $SW_2$ control the switches 28 in the output stage 18 in the constant-current operating mode to restrict the magnitude of the output current $I_{OUT}$. Thus, the LLC resonant power regulator system 10 can be configured in a variety of ways as disclosed herein.

Figure 2:
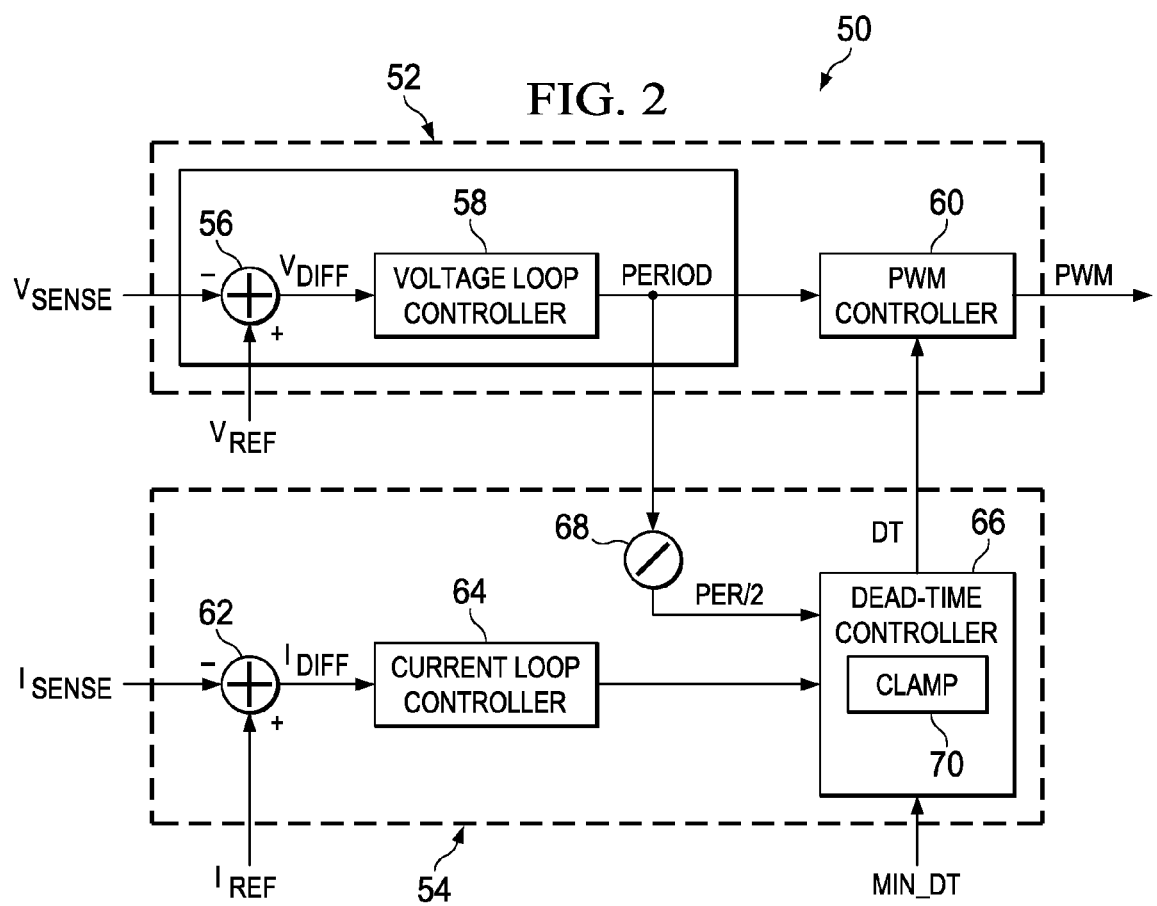
FIG. 2 illustrates an example of a controller for an LLC resonant power regulator system in accordance with an aspect of the invention.

FIG. 2 illustrates an example of a controller 50 for an LLC resonant power regulator system. As an example, the controller 50 can correspond to the controller 30 in the example of FIG. 1. Therefore, reference can be made to the example of FIG. 1 in the following description of the example of FIG. 2 for additional context. In addition, it is to be understood that the controller 50 could be configured as a digital controller, or could instead be implemented by analog circuit components or as a combination of analog and digital components.

The controller 50 includes a voltage loop portion 52 and a current loop portion 54. The voltage loop portion 52 includes an adder 56 configured to subtract the sense voltage $V_{SENSE}$ from the reference voltage $V_{REF}$. The difference, demonstrated in the example of FIG. 2 as a difference voltage $V_{DIFF}$, is provided to a voltage loop controller 58 that is configured to set a period of the signal PWM. In the example of FIG. 2, the period is demonstrated as a signal PERIOD. The signal PERIOD is provided to a PWM controller 60 that is configured to generate the signal PWM. As an example, the signal PWM signal can have an approximately 50% duty-cycle and can include a switching dead-time, as described herein.

The current loop 54 includes an adder 62 configured to subtract the sense current $I_{SENSE}$ from the reference current $I_{REF}$. The difference, demonstrated in the example of FIG. 2 as a difference current $I_{DIFF}$, is provided to a current loop controller 64. As an example, the current loop controller 64 can be a proportional-integral (PI) controller or an integrator only to integrate the difference current $I_{DIFF}$. The output of the current loop controller 64 is provided to a dead-time controller 66 that is configured to inject a switching dead-time DT into the signal PWM. The switching dead-time DT can correspond to a time between activation of the switches 20 in the input stage 16, such as to avoid shoot-through that can create a short circuit between the input voltage $V_{IN}$ and ground. The dead-time controller 66 can generate the switching dead-time by subtracting the output of the current loop controller 64 from a half of the period, PERIOD, demonstrated in the example of FIG. 2 as PERIOD/2 generated via a divider 68. In addition, the dead-time controller 66 includes a clamp 70 that is programmable with a predetermined minimum switching dead-time, demonstrated in the example of FIG. 2 as being provided via a signal MIN_DT. Thus, the dead-time controller 66 can set the duty-cycle of the signal PWM to include the minimum switching dead-time, such as during a normal resonance operating mode of the LLC resonant power regulator system 10.

As an example, during the normal resonance operating mode, the voltage loop portion 52 generates the signal PWM at the duty-cycle of approximately 50% while adjusting the period (i.e., the frequency) of the signal PWM to regulate the output voltage $V_{OUT}$. The predetermined reference current $I_{REF}$ can be selected to have a magnitude that is substantially greater than the output current $I_{OUT}$ in the normal resonance operating mode. Therefore, in the normal resonance operating mode, the difference current $I_{DIFF}$ is not equal to zero and can saturate the current loop controller 64 due to the integrator function therein. The difference between the half-period PERIOD/2 and the output of the current loop controller 64 is approximately zero, such that the dead-time controller 66 implements the minimum switching dead-time via the clamp 70 to provide the switching dead-time to the PWM controller 60. As a result, the signal PWM has a duty-cycle of approximately 50% with the minimum switching dead-time.

As another example, in response to a short-circuit or an overload condition (e.g., at the output of the LLC resonant power regulator system 10 of FIG. 1), the output current $I_{OUT}$ can substantially increase. As a result, the difference current $I_{DIFF}$ can have a magnitude that is inversely proportional to the output current $I_{OUT}$, and thus decreases in magnitude. As a result, the output of the current loop controller 64 can decrease and no longer be saturated, such that the difference between the half period PERIOD/2 and the output of the current loop controller 64 increases to increase the switching dead-time that is provided to the PWM controller 60. Therefore, the duty-cycle of the signal PWM is decreased based on the injected switching dead-time increasing, which results in a decrease in the magnitude in the output voltage $V_{OUT}$. Accordingly, the output current $I_{OUT}$ is reduced and eventually held to a substantially constant magnitude (e.g., approximately equal to the reference current $I_{REF}$) in a steady-state.

As a result of operating the LLC resonant power regulator system 10 in the constant-current operating mode, the LLC resonant power regulator system 10 can maintain a stable and substantially accurate constant magnitude of the output current $I_{OUT}$ through the load $R_L$, even in the presence of a short-circuit or overload condition. By decreasing the duty-cycle of the signal PWM (e.g., via injecting switching dead-time into the PWM signal) in addition to modulating the frequency of the signal PWM, the LLC resonant power regulator system 10 is not restricted by hardware limitations regarding switching frequency. Furthermore, because both the voltage loop portion 52 and the current loop portion 54 of the controller 50 operate concurrently to generate the variable frequency PWM and the associated switching dead-time, transitions between the normal resonance operating mode and the constant-current operating mode can be very smooth.

The controller 50 is not intended to be limited to the example of FIG. 2. As an example, other configurations of the controller 50 can be implemented for switching the LLC resonant power regulator system 10 between the normal resonance operating mode and the constant-current operating mode.

Figure 3:
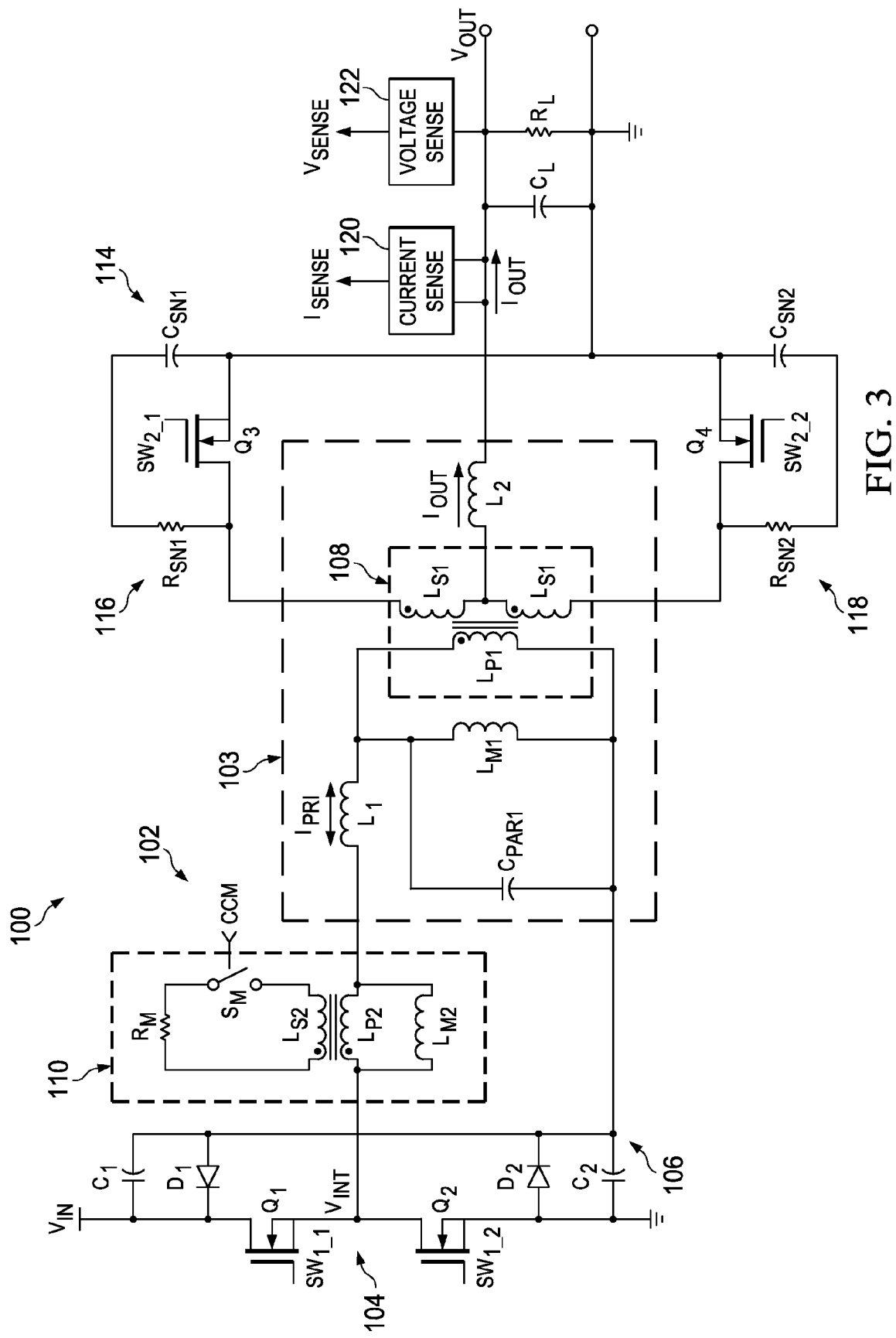
FIG. 3 illustrates an example of an LLC resonant power regulator in accordance with an aspect of the invention.

FIG. 3 illustrates an example of an LLC resonant power regulator 100. The LLC resonant power regulator 100 can correspond to LLC resonant power regulator system 10 in the example of FIG. 1. Therefore, reference may be made to the example of FIG. 1 in the following description of the example of FIG. 3 for additional context.

The LLC resonant power regulator 100 includes an input stage 102 that is interconnected between a high voltage rail, demonstrated as the input voltage $V_{IN}$, and a low voltage rail, demonstrated as ground. The input stage 102 includes a plurality of switches, demonstrated in the example of FIG. 3 as N-type MOSFETs $Q_1$ and $Q_2$ that are controlled, respectively, by switching signals $SW_{1\_1}$ and $SW_{1\_2}$. In the example of FIG. 3, the MOSFET $Q_1$ is coupled to the input voltage $V_{IN}$, the MOSFET $Q_2$ is coupled to ground, and the MOSFETs $Q_1$ and $Q_2$ are interconnected in series by a switching node 104 having a voltage $V_{INT}$. Therefore, the MOSFETs $Q_1$ and $Q_2$ are demonstrated in the example of FIG. 3 as being arranged as a half-bridge, although other topologies could be utilized. A pair of diodes $D_1$ and $D_2$ are also arranged between ground and the input voltage $V_{IN}$, the pair of diodes $D_1$ and $D_2$ being separated by an intermediate node 106. A pair of resonance capacitors $C_1$ and $C_2$ are arranged in parallel with the respective pair of diodes $D_1$ and $D_2$. However, it is to be understood that the input stage 102 could alternatively just include a single one of the pair of resonance capacitors $C_1$ and $C_2$.

The input stage 102 includes an integrated transformer 103 that is configured to conduct a primary resonant current $I_{PRI}$ in response to the activation and deactivation of the MOSFETs $Q_1$ and $Q_2$. In the example of FIG. 3, the integrated transformer 103 includes a magnetizing inductor $L_{M1}$ associated with an inductive coupling 108 and a leakage inductor $L_1$, which could serve as a resonant inductor, that are coupled to a primary inductor $L_{P1}$ of the inductive coupling 108. It is to be understood that the leakage inductor $L_1$ can be implemented either fully as a leakage inductance, or as a sum of a discrete resonant inductance and a leakage inductance. A parasitic capacitor $C_{PAR1}$ interconnects the primary inductor $L_{P1}$, the leakage inductor $L_1$, and the magnetizing inductor $L_{M1}$ to the intermediate node 106. It is to be understood that, in the example of FIG. 3, the magnetizing inductor $L_{M1}$ represents a reactance of the primary inductor $L_{P1}$ of the inductive coupling 108 according to an ideal transformer model. The primary resonant current $I_{PRI}$ can therefore flow and resonate through the input stage 102 in response to the activation and deactivation of the MOSFETs $Q_1$ and $Q_2$.

In addition, the input stage 102 includes an inductance circuit 110. The inductance circuit 110 includes a transformer 112 having a primary inductor $L_{P2}$ and a secondary inductor $L_{S2}$. The secondary inductor $L_{S2}$ is arranged in series with a resistor $R_M$ and a switch $S_M$ that are configured in a loop. For instance, the resistor $R_M$ can represent a parasitic resistance of the inductance circuit 110. The switch $S_M$ can be a semiconductor or other type of switch or contactor, and is demonstrated as controlled by a signal CCM, such as provided from the controller 30 of FIG. 1. As an example, the switch $S_M$ can be closed during the normal resonance operating mode of the LLC resonant power regulator 100. In addition, the inductance circuit 110 includes a magnetizing inductor $L_{M2}$ arranged in parallel with the primary inductor $L_{P2}$. The magnetizing inductor $L_{M2}$ represents a reactance of the primary inductor $L_{P2}$ of the transformer 112 according to an ideal transformer model.

The LLC resonant power regulator 100 also includes an output stage 114 configured to conduct the output current $I_{OUT}$. In response to the oscillation of the primary resonant current $I_{RES}$ through the primary inductor $L_{P1}$ of the inductive coupling 108, a secondary inductor $L_{S1}$ of the inductive coupling 108 generates the output current $I_{OUT}$ based on the magnetic flux through the core of the inductive coupling 108. In the example of FIG. 3, the output stage 114 includes an output leakage inductor $L_2$ coupled to the approximate center of the secondary inductor $L_{S2}$ and the load $R_L$. The output stage 114 also includes a MOSFET $Q_3$ (e.g., an N-type MOSFET) coupled with a resistor $R_{SN1}$ and a capacitor $C_{SN1}$ arranged in a first loop 116, and a MOSFET $Q_4$ (e.g., an N-type MOSFET) coupled with a resistor $R_{SN2}$ and a capacitor $C_{SN2}$ arranged in a second loop 118. For example, the resistor $R_{SN1}$ and the capacitor $C_{SN1}$, as well as the resistor $R_{SN2}$ and the capacitor $C_{SN2}$, are each arranged as RC snubber circuits, although it is to be understood that other types of snubber circuits could be used instead. In the example of FIG. 3, the MOSFET $Q_3$ is controlled via a switching signal $SW_{2\_1}$ and the MOSFET $Q_4$ is controlled via a switching signal $SW_{2\_2}$, which can correspond to the switching signals $SW_2$ in the example of FIG. 1. For example, the switching signals $SW_{2\_1}$ and $SW_{2\_2}$ can be implemented for active control of the MOSFETs $Q_3$ and $Q_4$. The loops 116 and 118 are arranged at opposite ends of the inductive coupling 108. The arrangement of the MOSFET $Q_3$, the resistor $R_{SN1}$, and the capacitor $C_{SN1}$ in the loop 116 and the arrangement of the MOSFET $Q_4$, the resistor $R_{SN2}$, and the capacitor $C_{SN2}$ in the loop 118 are configured to rectify the output current $I_{OUT}$. Therefore, the output current $I_{OUT}$ flows as a DC current through the leakage inductor $L_2$ and through the load $R_L$ to generate the output voltage $V_{OUT}$.

Similar to as demonstrated in the example of FIG. 3, the LLC resonant power regulator 100 includes a voltage sense component 122 configured to generate the sense voltage $V_{SENSE}$ and a current sense component 120 configured to generate the sense current $I_{SENSE}$. The sense voltage $V_{SENSE}$ can be provided to a controller, such as the controller 30 in the example of FIG. 1, for regulating the output voltage $V_{OUT}$ via the switching signals $SW_{1\_1}$ and $SW_{1\_2}$. The sense current $I_{SENSE}$ can likewise be provided to the controller 30, which can thus be implemented by the controller 30 to switch the LLC resonant power regulator 100 between the normal resonance operating mode and the constant-current operating mode. As an example, the controller 30 can switch the LLC resonant power regulator 100 to the constant-current operating mode in response to the output current $I_{OUT}$ being approximately equal to the reference current $I_{REF}$ to maintain the magnitude of the output current $I_{OUT}$ approximately equal to the reference current $I_{REF}$.

For example, in the normal resonance operating mode, the switch $S_M$ is closed to short the magnetizing inductor $L_{M2}$. Thus, the primary resonant current $I_{PRI}$ flows unmitigated through the primary inductor $L_{P1}$. However, in response to the output current $I_{OUT}$ being approximately equal to or exceeding the reference current $I_{REF}$, such as based on short-circuit or overload condition, the controller 30 switches to the constant-current operating mode. In response, the controller 30 can be configured to open the switch $S_M$ via the signal CCM. For example, the controller 30 can provide the signal CCM as a pulse to alternate the state of the switch $S_M$ between open and closed.

As a result of the opening of the switch $S_M$, the magnetic field through the secondary inductor $L_{S2}$ reverses to inject a high magnetizing inductance into the input stage 102, as represented by the magnetizing inductor $L_{M2}$. As an example, the magnetizing inductance can be large relative to the inductance of the leakage inductor $L_1$ (e.g., ten times or more). In response, the MOSFETs $Q_1$ and $Q_2$ begin to adjust their respective duty-cycles (e.g., decrease duty-cycles), such that the MOSFETs $Q_1$ and $Q_2$ operate as an asymmetrical half-bridge. For example, in response to switching to the constant-current operating mode, the duty-cycle of the switching signals $SW_{1\_1}$ and $SW_{1\_2}$ can change (e.g., decrease) to decrease the magnitude of the less resonant current $I_{PRI}$ flowing through the resonant tank of the input stage 102 due to the injected magnetizing inductor $L_{M2}$. It is to be understood that the resonance frequency can decrease significantly, such that the resonant portion of the resonant current $I_{PRI}$ may be insignificant based on an increase of the resonance-inductance based on the injection of the inductor $L_{M2}$. The decrease in the resonance frequency of the resonant current $I_{PRI}$ effectively transforms the input stage 102 into an asymmetrical half-bridge. Accordingly, the change to the resonance of the primary resonance current $I_{PRI}$ results in regulation of the output current $I_{OUT}$ to a substantially constant magnitude (e.g., approximately equal to the reference current $I_{REF}$) via the magnetic flux coupling of the inductive coupling 108.

As a result of the operation of the MOSFETs $Q_1$ and $Q_2$ of the LLC resonant power regulator 100 as an asymmetrical half-bridge, the LLC resonant power regulator 100 can maintain a stable and substantially accurate constant magnitude of the output current $I_{OUT}$ through the load $R_L$, even in the presence of a short-circuit or overload condition. It may thus not be necessary for the controller 30 to modulate the switching frequency of the switching signals $SW_{1\_1}$ and $SW_{1\_2}$, which can result in a reduction of power losses on the MOSFETs $Q_1$ and $Q_2$ and the inductive coupling 108.

Figure 4:
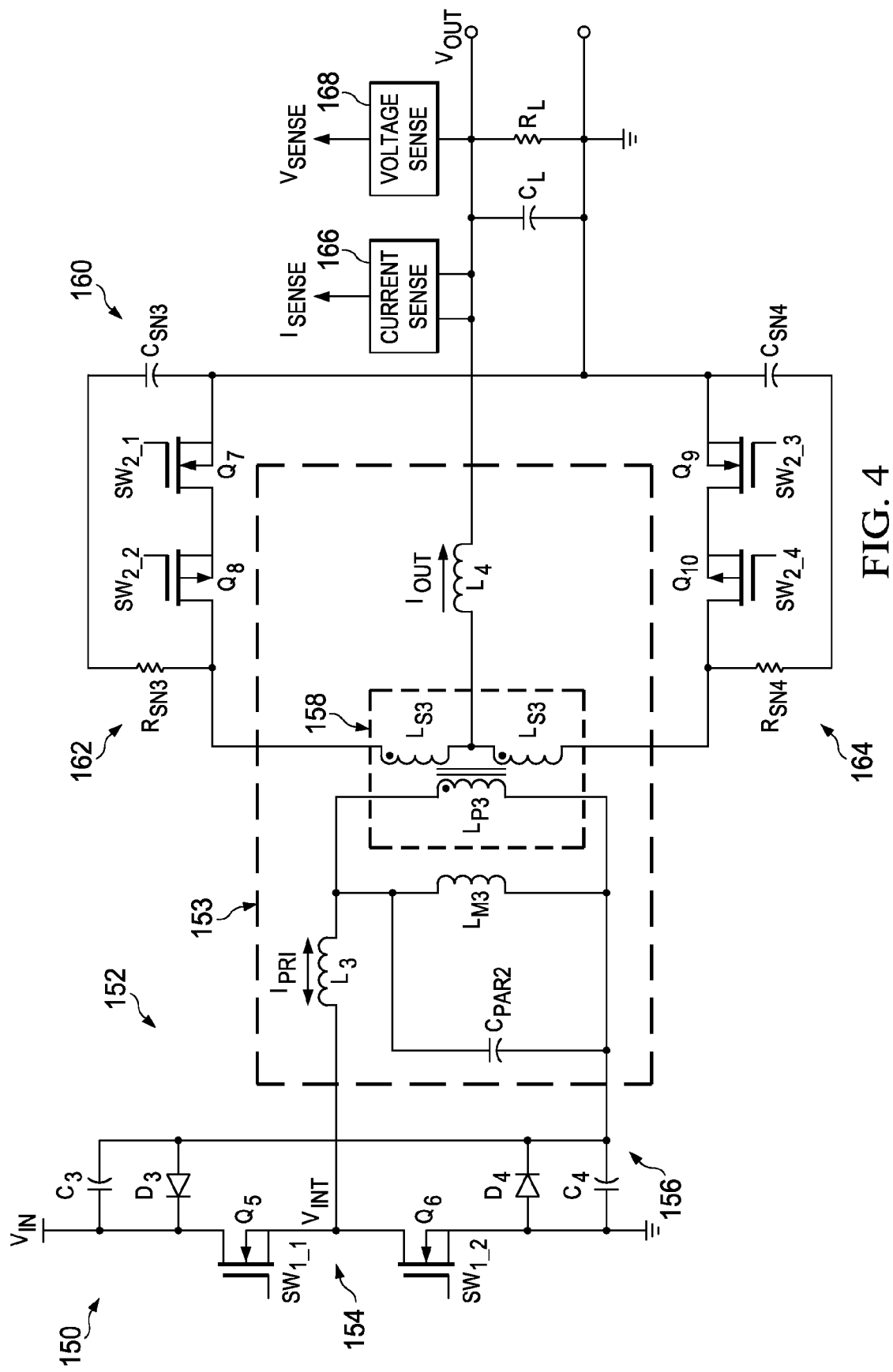
FIG. 4 illustrates another example of an LLC resonant power regulator in accordance with an aspect of the invention.

FIG. 4 illustrates another example of an LLC resonant power regulator 150. The LLC resonant power regulator 150 can correspond to LLC resonant power regulator system 10 in the example of FIG. 1. Therefore, reference can be made to the example of FIG. 1 in the following description of the example of FIG. 3 for additional context.

The LLC resonant power regulator 150 includes an input stage 152 that is interconnected between a high voltage rail, demonstrated as the input voltage $V_{IN}$, and a low voltage rail, demonstrated as ground. The input stage 152 includes a plurality of switches, demonstrated in the example of FIG. 4 as MOSFETs $Q_5$ and $Q_6$ (e.g., N-type MOSFETs) that are controlled, respectively, by switching signals $SW_{1\_1}$ and $SW_{1\_2}$. In the example of FIG. 4, the MOSFET $Q_5$ is coupled to the input voltage $V_{IN}$, the MOSFET $Q_6$ is coupled to ground, and the MOSFETs $Q_5$ and $Q_6$ are interconnected in series by a switching node 154 having a voltage $V_{INT}$. Therefore, the MOSFETs $Q_5$ and $Q_6$ are demonstrated in the example of FIG. 4 as being arranged as a half-bridge. A pair of diodes $D_3$ and $D_4$ are also arranged between ground and the input voltage $V_{IN}$, the pair of diodes $D_3$ and $D_4$ being separated by an intermediate node 156. A pair of resonance capacitors $C_3$ and $C_4$ are arranged in parallel with the respective pair of diodes $D_3$ and $D_4$. However, it is to be understood that the input stage 152 could alternatively just include a single one of the pair of resonance capacitors $C_3$ and $C_4$.

The input stage 152 includes a transformer 153 that is configured to conduct a primary resonant current $I_{PRI}$ in response to the activation and deactivation of the MOSFETs $Q_5$ and $Q_6$. In the example of FIG. 4, the transformer 153 includes a magnetizing inductor $L_{M2}$ associated with an inductive coupling 158 and a leakage inductor $L_3$ that are coupled to a primary inductor $L_{P3}$ of the inductive coupling 158. A parasitic capacitor $C_{PAR2}$ interconnects the primary inductor $L_{P3}$, the leakage inductor $L_3$, and the magnetizing inductor $L_{M3}$ to the intermediate node 156. It is to be understood that, in the example of FIG. 4, the magnetizing inductor $L_{M3}$ represents a reactance of the primary inductor $L_{P3}$ of the inductive coupling 158 according to an ideal transformer model. The primary resonant current $I_{PRI}$ can therefore flow and resonate through the input stage 158 in response to the activation and deactivation of the MOSFETs $Q_5$ and $Q_6$.

The LLC resonant power regulator 150 also includes an output stage 160 configured to conduct the output current $I_{OUT}$. In response to the oscillation of the primary resonant current $I_{RES}$ through the primary inductor $L_{P3}$ of the inductive coupling 158, a secondary inductor $L_{S3}$ of the inductive coupling 158 generates the output current $I_{OUT}$ based on the magnetic flux through the core of the inductive coupling 158. In the example of FIG. 4, the output stage 160 includes an output leakage inductor $L_4$ coupled to the approximate center of the secondary inductor $L_{S3}$ and the load $R_L$.

The output stage 160 also includes an N-type MOSFET $Q_7$ and a P-type MOSFET $Q_8$ arranged in series, with the MOSFET $Q_8$ coupled to a resistor $R_{SN3}$ and the secondary inductor $L_{S3}$ and with the MOSFET $Q_7$ coupled to a capacitor $C_{SN4}$ and arranged in a first loop 162. The output stage 160 further includes an N-type MOSFET $Q_9$ and a P-type MOSFET $Q_{10}$ arranged in series, with the MOSFET $Q_{10}$ coupled to a resistor $R_{SN4}$ and the secondary inductor $L_{S3}$ and with the MOSFET $Q_9$ coupled to a capacitor $C_{SN4}$ and arranged in a second loop 164. In the example of FIG. 4, the MOSFET $Q_7$ is controlled via a switching signal $SW_{2\_1}$, the MOSFET $Q_8$ is controlled via a switching signal $SW_{2\_2}$, the MOSFET $Q_9$ is controlled via a switching signal $SW_{2\_3}$, and the MOSFET $Q_{10}$ is controlled via a switching signal $SW_{2\_4}$, which can collectively correspond to the switching signals $SW_2$ in the example of FIG. 1.

The arrangement of the components in the first loop 162 and the second loop 164 are to rectify the output current $I_{OUT}$. Therefore, the output current $I_{OUT}$ flows as a DC current through the leakage inductor $L_4$ and through the load $R_L$ to generate the output voltage $V_{OUT}$. Similar to as demonstrated in the example of FIG. 4, the LLC resonant power regulator 150 includes a voltage sense component 166 configured to generate the sense voltage $V_{SENSE}$ and a current sense component 168 configured to generate the sense current $I_{SENSE}$. The sense voltage $V_{SENSE}$ can be provided to a controller, such as the controller 30 in the example of FIG. 1, for regulating the output voltage $V_{OUT}$ via the switching signals $SW_{1\_1}$ and $SW_{1\_2}$. The sense current $I_{SENSE}$ can likewise be provided to the controller 30 (FIG. 1), which can be utilized to switch the LLC resonant power regulator 150 between the normal resonance operating mode and the constant-current operating mode. As an example, the controller 30 can switch the LLC resonant power regulator 150 to the constant-current operating mode in response to the output current $I_{OUT}$ being approximately equal to or greater than the reference current $I_{REF}$ to maintain the magnitude of the output current $I_{OUT}$ approximately equal to the reference current $I_{REF}$.

For example, in the normal resonance operating mode, the controller 30 can indicate to the switch control stage 12 to set the switching signals $SW_{2\_2}$ and $SW_{2\_4}$ to have a duty-cycle that is either approximately 50% or approximately 100% (e.g., always on) for respective control of the MOSFETs $Q_8$ and $Q_{10}$. Also in the normal resonance operating mode, the controller 30 can provide controls to the switch control stage 12 to set the switching signals $SW_{2\_1}$ and $SW_{2\_3}$ for active control of the MOSFETs $Q_7$ and $Q_9$. However, in response to the output current $I_{OUT}$ being approximately equal to or greater than the reference current $I_{REF}$, such as based on a short-circuit or overload condition, the controller 30 switches to the constant-current operating mode. In response, the controller 30 can be configured to reverse the operation of the MOSFETs $Q_7$ and $Q_9$ relative to the MOSFETs $Q_8$ and $Q_{10}$. For example, the controller 30 can indicate to the switch control stage 12 to set the switching signals $SW_{2\_1}$ and $SW_{2\_3}$ to have a duty-cycle that is either approximately 50% or approximately 100% (e.g., always on) for respective control of the MOSFETs $Q_7$ and $Q_9$, and the controller 30 can indicate to the switch control stage 12 to set the switching signals $SW_{2\_2}$ and $SW_{2\_4}$ to provide active control of the MOSFETs $Q_8$ and $Q_{10}$.

As a result of the change in operation of the MOSFETs $Q_7$ through $Q_{10}$ in the respective first and second loops 160 and 162, a portion of the output current $I_{OUT}$ can be shunted to ground through the first and second loops 160 and 162. Thus, based on the active control of the MOSFETs $Q_8$ and $Q_{10}$, the magnitude of the output current $I_{OUT}$ can be held to be substantially constant (e.g., approximately equal to the reference current $I_{REF}$). For example, the active control of the MOSFETs $Q_8$ and $Q_{10}$ can be based on monitoring the sense current $I_{SENSE}$ for closed-loop control of the output current $I_{OUT}$. Accordingly, the output current $I_{OUT}$ can be maintained at substantially constant magnitude.

As a result of the operation of the MOSFETs $Q_7$ through $Q_{10}$ of the LLC resonant power regulator 150 as an asymmetrical half-bridge, the LLC resonant power regulator 150 can maintain a stable and substantially accurate constant magnitude of the output current $I_{OUT}$ through the load $R_L$, even in the presence of a short-circuit or overload condition. It may thus not be necessary for the controller 30 to modulate the switching frequency of the switching signals $SW_{1\_1}$ and $SW_{1\_2}$, which can result in a reduction of power losses on the MOSFETs $Q_3$ and $Q_4$ and the inductive coupling 158.

Figure 5:
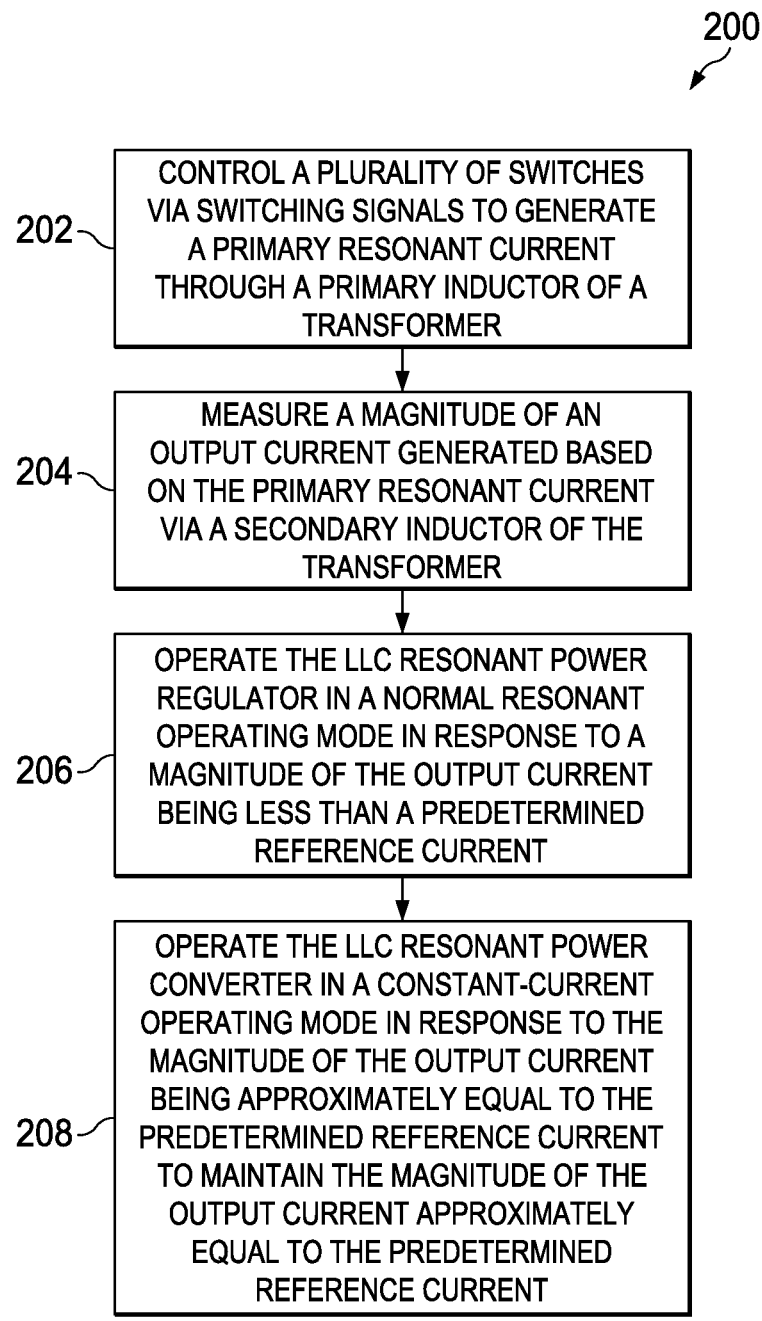
FIG. 5 illustrates an example of a method for maintaining a substantially constant output current in an LLC resonant power regulator in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for maintaining a substantially constant output current in an LLC resonant power regulator. At 202, a plurality of switches are controlled via switching signals to generate a primary resonant current through a primary inductor of a transformer. At 204, a magnitude of an output current generated based on the primary resonant current via a secondary inductor of the transformer is measured. The output current can be rectified to flow as a DC current through a load. At 206, the LLC resonant power regulator is operated in a normal resonance operating mode in response to a magnitude of the output current being less than a predetermined reference current. In the normal resonance operating mode, the duty-cycle of the switching signals can be approximately 50% with a predetermined minimum switching dead-time.

At 208, the LLC resonant power regulator is operated in a constant-current operating mode in response to the magnitude of the output current being approximately equal to the predetermined reference current to maintain the magnitude of the output current approximately equal to the predetermined reference current. In the constant-current operating mode, the duty-cycle of the switching signals can be reduced to substantially limit the magnitude of the output current to the predetermined reference current. The duty-cycle can be reduced by generating a switching dead-time that is greater than the predetermined minimum switching dead-time based on a difference between the output current and the predetermined reference current.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An LLC resonant power converter system comprising:
   a transformer comprising a primary inductor and a secondary inductor;
   a switch control stage configured to generate a plurality of switching signals having a duty-cycle;
   an input stage comprising the primary inductor and a plurality of switches that are controlled in response to the respective plurality of switching signals to generate a primary resonant current;
   an output stage comprising the secondary inductor and being configured to conduct an output current through a load based on a secondary resonant current to generate an output voltage; and
   a controller configured to control the duty cycle of the plurality of switching signals to limit the output current to a predetermined magnitude in response to variations of the load, wherein the controller comprises:
   a voltage loop controller configured to generate a signal defining a period of the plurality of switching signals based on a difference between a reference voltage and the output voltage;
   a pulse-width modulation (PWM) controller configured to control the duty-cycle of the plurality of switching signals based on the period;
   a current loop controller configured to generate a current difference signal based on a difference between a reference current and the output current; and
   a dead-time controller configured to define a switching dead-time for the plurality of switches based on the current difference signal, the switching dead-time being provided to the PWM controller to set the switching dead-time of the plurality of switching signals to limit the output current to the predetermined magnitude.

2. The system of claim 1, wherein the controller is configured to set the LLC resonant power converter system to operate in a normal resonance operating mode in response to the output current having a magnitude that is less than the predetermined magnitude and to set the LLC resonant power converter system to operate in a constant-current operating mode in response to the output current having a magnitude that is approximately equal to the predetermined magnitude to maintain the magnitude of the output current at approximately the predetermined magnitude during the constant-current operating mode.

3. The system of claim 2, wherein the controller is configured to reduce the duty-cycle of the plurality of switching signals in the constant-current operating mode to maintain the magnitude of the output current at approximately the predetermined magnitude.

4. The system of claim 1, wherein the dead-time controller comprises a clamp configured to define a predetermined minimum switching dead-time for the plurality of switches during a normal resonance operating mode of the LLC resonant power regulator.

5. The system of claim 1, wherein the controller comprises a voltage loop portion configured to define a period of the plurality of switching signals in a normal resonance operating mode and a current loop portion configured to reduce the duty-cycle to maintain the magnitude of the output current to approximately the predetermined magnitude in a constant-current operating mode.

6. The system of claim 5, wherein the current loop portion comprises a dead-time controller configured to increase a switching dead-time above a predetermined minimum switching dead-time in the constant-current operating mode in response to the output current being approximately equal to a predetermined current limit to maintain the magnitude of the output current at the predetermined current limit.

7. A method for maintaining a substantially constant output current in an LLC resonant power regulator, the method comprising:
controlling a plurality of switches via switching signals to generate a primary resonant current through a primary inductor of a transformer by generating a signal defining a period of the plurality of switching signals based on a difference between a reference voltage and the output voltage;
pulse-width modulation (PWM) control of the duty-cycle of the plurality of switching signals based on the period;
measuring a magnitude of an output current generated based on the primary resonant current via a secondary inductor of the transformer;
operating the LLC resonant power regulator in a normal resonance operating mode in response to a magnitude of the output current being less than a predetermined reference current; and
operating the LLC resonant power regulator in a constant-current operating mode in response to the magnitude of the output current being at least approximately equal to the predetermined reference current to maintain the magnitude of the output current approximately equal to the predetermined reference current by generating a current difference signal based on a difference between a reference current and the output current using a current loop controller, and defining a switching dead-time for the plurality of switches based on the current difference signal, the switching dead-time being provided to the PWM controller to set the switching dead-time of the plurality of switching signals to limit the output current to the predetermined magnitude.

8. The method of claim 7, further comprising setting a period of the switching signals based on an output voltage that is generated based on the output current flow through a load.

9. The method of claim 8, wherein setting the period comprises:
measuring a magnitude of the output voltage;
subtracting the output voltage from a predetermined reference voltage to generate a difference; and
setting the period of the switching signals based on the difference.

10. The method of claim 8, wherein operating the LLC resonant power regulator in the constant-current operating mode comprises reducing the duty-cycle of the plurality of switching signals in the constant-current operating mode based on a difference between the output current and the predetermined reference current.

11. The method of claim 10, wherein reducing the duty-cycle of the switching signals comprises:
subtracting the output current from the predetermined reference current to generate a current difference signal;
setting a switching dead-time of the switching signals based on the current difference signal; and
adjusting the duty-cycle of the switching signals based on the switching dead-time.

12. The method of claim 11, further comprising defining a predetermined minimum switching dead-time associated with the normal resonance operating mode.

13. An LLC resonant power converter system comprising:
a transformer comprising a primary inductor and a secondary inductor;
a switch control stage configured to generate a first plurality of switching signals and a second set of switching signals;
an input stage comprising the primary inductor, an inductance circuit, and a first plurality of switches that are controlled in response to the respective first plurality of switching signals to generate a primary resonant current;
an output stage comprising the secondary inductor and a second plurality of switches that are controlled in response to the respective second plurality of switching signals to conduct an output current through a load based on the primary resonant current to generate an output voltage; and
a controller configured to control the inductance circuit to limit a magnitude of the output current to a predetermined magnitude in response to variations of the load, wherein the inductance circuit comprises a first inductor and a second inductor, the first inductor being arranged in series with the primary inductor and being inductively coupled with the second inductor to form a second transformer, the controller being configured to inject a magnetizing inductance into the input stage via the second transformer.

14. The system of claim 13, wherein the inductance circuit further comprises a switch and a resistor in series with the second inductor, the controller being configured to open the switch upon the output current being approximately equal to a predetermined current magnitude to limit the magnitude of the output current approximately equal to the predetermined current magnitude.

15. The system of claim 13, wherein the controller is configured to set the LLC resonant power converter system to operate in a normal resonance operating mode in response to the output current having a magnitude that is less than the predetermined magnitude and to set the LLC resonant power converter system to operate in a constant-current operating mode in response to the output current having a magnitude that is approximately equal to the predetermined magnitude to maintain the magnitude of the output current at approximately the predetermined magnitude.

16. The system of claim 15, wherein the controller is configured to set the plurality of switches to operate substantially as an asymmetrical half-bridge in the constant-current operating mode.

17. An LLC resonant power converter system comprising:
a transformer comprising a primary inductor and a secondary inductor;
a switch control stage configured to generate a first plurality of switching signals and a second set of switching signals in response to at least one pulse-width modulation (PWM) signal;
an input stage comprising the primary inductor and a first plurality of switches that are controlled in response to the respective first plurality of switching signals to generate a primary resonant current;
an output stage comprising the secondary inductor and a second plurality of switches that are controlled in response to the respective second plurality of switching signals to conduct an output current through a load based on a secondary resonant current to generate an output voltage; and
a controller configured to set the at least one PWM signal to control the second plurality of switches via the second plurality of switching signals in a normal resonance operating mode to regulate the output voltage and to set the at least one PWM signal to control the second plurality of switches via the second plurality of switching signals in a constant-current operating mode to limit a magnitude of the output current approximately equal to a predetermined current magnitude, wherein the controller is configured to monitor a magnitude of the output current and to set the LLC resonant power converter system to operate in the normal resonance operating mode in response to the output current having a magnitude that is less than the predetermined magnitude and to set the LLC resonant power converter system to operate in the constant-current operating mode in response to the magnitude of the output current being approximately equal to the predetermined magnitude.

18. The system of claim 17, wherein the second plurality of switches comprises a pair of N-type metal-oxide semiconductor field-effect transistors (MOSFETs) coupled to the second inductor on opposite ends of the second inductor and a pair of P-type MOSFETs respectively coupled in series with the pair of N-type MOSFETs and coupled with each other.

19. The system of claim 18, wherein the controller configured to set the at least one PWM signal to actively control the pair of N-type MOSFETs and to control the pair of P-type MOSFETs with a duty-cycle that is one of approximately 50% and approximately 100% in the normal resonance operating mode, and wherein the controller configured to set the at least one PWM signal to actively control the pair of P-type MOSFETs and to control the pair of N-type MOSFETs with a duty-cycle that is one of approximately 50% and approximately 100% in the constant-current operating mode.

* * * * *